United States Patent
Zhao et al.

(10) Patent No.: US 12,365,826 B2
(45) Date of Patent: Jul. 22, 2025

(54) HTHP CORROSION RESISTANT COMPOSITE SEAL VIA RECRYSTALLIZATION OF REACTIVE COMPOSITE: FORMULATION AND DEPLOYMENT

(71) Applicants: CNPC USA CORP., Houston, TX (US); BEIJING HUAMEI, INC., Beijing (CN); CHINA NATIONAL PETROLEUM CORPORATION, Beijing (CN)

(72) Inventors: Lei Zhao, Houston, TX (US); Jiaxiang (Jason) Ren, Houston, TX (US); Timothy Dunne, Pearland, TX (US); Peng Cheng, Houston, TX (US)

(73) Assignees: CNPC USA CORPORATION, Houston, TX (US); BEIJING HUAMEI, INC, Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 8 days.

(21) Appl. No.: 18/447,833

(22) Filed: Aug. 10, 2023

(65) Prior Publication Data

US 2025/0051628 A1    Feb. 13, 2025

(51) Int. Cl.
| | | |
|---|---|---|
| *C09K 8/42* | (2006.01) | |
| *E21B 23/02* | (2006.01) | |
| *E21B 33/124* | (2006.01) | |

(52) U.S. Cl.
CPC .............. *C09K 8/426* (2013.01); *E21B 23/02* (2013.01); *E21B 33/1243* (2013.01)

(58) Field of Classification Search
CPC ...... C09K 8/426; E21B 23/02; E21B 33/1243
See application file for complete search history.

(56) References Cited

U.S. PATENT DOCUMENTS

| | | | |
|---|---|---|---|
| 11,299,955 B2 | 4/2022 | Fripp et al. | |
| 2019/0119161 A1* | 4/2019 | Kierat | C04B 22/066 |
| 2020/0048530 A1 | 2/2020 | Nguyen et al. | |
| 2022/0186579 A1 | 6/2022 | Pelto et al. | |
| 2022/0325600 A1 | 10/2022 | Fripp et al. | |
| 2022/0341280 A1 | 10/2022 | Holderman et al. | |
| 2023/0116957 A1* | 4/2023 | Sonat | C09K 8/42 |
| | | | 277/650 |

FOREIGN PATENT DOCUMENTS

| | | |
|---|---|---|
| WO | 2016073004 A | 5/2016 |
| WO | 2017151118 A | 8/2017 |
| WO | 2019/164499 A1 | 8/2019 |

(Continued)

OTHER PUBLICATIONS

International Search Report and Written Opinion received on Jul. 17, 2024 for PCT/US2024/17092.

(Continued)

*Primary Examiner* — Alicia Bland
(74) *Attorney, Agent, or Firm* — Frank Gao, Esq.

(57) ABSTRACT

The Patent Application discloses an in-situ swellable composition suitable for use in subterranean wells. The swellable composition may comprise a composite material. The composite material swells on contact with water due to chemical reaction of the composite material.

7 Claims, 2 Drawing Sheets

(56) References Cited

FOREIGN PATENT DOCUMENTS

| WO | 2021072166 A | 4/2021 | |
|---|---|---|---|
| WO | 2021076141 A | 4/2021 | |
| WO | 2023055357 A | 4/2023 | |
| WO | WO-2023055357 A1 * | 4/2023 | ............. C01B 33/12 |

OTHER PUBLICATIONS

Haruto Muraishi; The Reaction of Magnesium Hydroxide with Soluble Silica under Hydrothermal Conditions below the Critical Temperature, The Chemical Society of Japan Bull. Chem. Soc. Jpn., 54, 878-8833 (1981) vol. 54, No. 3.

Scott Allan Nye, et al; "Use of Olivine for The Production of MgO—SiO2 Binders"; frontiers in Built Environment, May 21, 2021, vol. 7, Article 640243, 8 pages.

Michael Fripp, et al; "Novel Expanding Metal Alloy for Non-Elastomeric Sealing and Anchoring", Society of Petroleum Engineers, prepared at the 2022 SPE Annual Technical Conference and Exhibition held in Houston, Texas, Oct. 3-5, 2022; 8 pages.

Rutger Evers; "A Unique Breakthrough in Material Science", https://worldoil.com/magazine/2021/may-2021/special-focus/a-unique-breakthrough-in-material-science; 11 pages.

* cited by examiner

HTHP CORROSION RESISTANT COMPOSITE SEAL VIA RECRYSTALLIZATION OF REACTIVE COMPOSITE: FORMULATION AND DEPLOYMENT

TECHNICAL FIELD AND INDUSTRIAL APPLICABILITY

The invention disclosure relates to a packer or plug in oil and gas field, in particular, a high temperature high pressure corrosion resistant composite seal via crystallization of reactive composite.

BACKGROUND

In the course of treating and preparing subterranean wells for production, a well packer is run into the well on a work string or a production tubing. The purpose of the packer is to support production tubing and other completion equipment, such as a screen adjacent to a producing formation, and to seal the annulus between the outside of the production tubing and the inside of the well casing to block movement of fluids through the annulus past the packer location. The packer is provided with anchor slips having opposed camming surfaces, which cooperate with complementary opposed wedging surfaces, whereby the anchor slips are radially extendible into gripping engagement against the well casing bore in response to relative axial movement of the wedging surfaces.

The packer also carries annular seal elements, which are expandable radially into sealing engagement against the bore of the well casing in response to axial compression forces. Longitudinal movement of the packer components, which set the anchor slips and the sealing elements, may be produced either hydraulically or mechanically.

After the packer has been set and sealed against the well casing bore, it should maintain sealing engagement upon removal of the hydraulic or mechanical setting force. Moreover, it is essential that the packer remain locked in its set and sealed configuration while withstanding hydraulic pressures applied externally or internally from the formation and/or manipulation of the tubing string and service tools without unsetting the packer or interrupting the seal. This is made more difficult in deep wells in which the packer and its components are subjected to high downhole temperatures, for example, as high as 600 degrees F., and high downhole pressures, for example, 5,000 pounds per square inch ("psi"). Moreover, the packer should be able to withstand variation of externally applied hydraulic pressures at levels up to as much as 15,000 psi in both directions.

There is a need, therefore, for a packer that can effectively seal the wellbore at high temperature and high pressure wellbore conditions.

SUMMARY

In one aspect, one embodiment discloses an in-situ swellable packer useable for isolating sections of a wellbore. The in-situ swellable packer comprises a cylindrical body having a backup piece at least at one end of the cylindrical body, a tube. The tube may extend through the cylindrical body and backup piece. The cylindrical body may be made of swellable material expandable vertical to the tube to form an in-situ packer at downhole.

Optionally in any aspect, the backup piece is expandable vertical to the tube upon a trigger action.

Optionally in any aspect, the swellable material comprises an inorganic material.

Optionally in any aspect, the composite material swells on contact with water due to chemical reaction of the composite material.

Optionally in any aspect, the composite material comprises a reactive oxide.

Optionally in any aspect, the composite material comprises magnesium.

Optionally in any aspect, the reactive oxide comprises silicon oxide.

Optionally in any aspect, the oxide further comprises an inert oxide.

Optionally in any aspect, the inert oxide volume percent is from about 20% to about 60%, in one embodiment, from about 10% to about 40%.

Further in another aspect, one embodiment discloses a method for manufacturing swellable compositions suitable for use in subterranean wells.

The method comprise steps of admixing a swellable composite material with an oxide to form a premix; adding an inert oxide to the premix to form a mixture; and pressing the mixture to a compact.

Optionally in any aspects, the swellable composite material comprises magnesium, aluminum, or their alloys. Magnesium will react with water to form magnesium hydroxide. The magnesium hydroxide will react with silicate or oxide to form a salt.

Optionally in any aspects, the compact has pores, wherein the pores have porosity from about 0.5% to about 10%.

Optionally in any aspects, the inert oxide volume percent is from about 20% to about 60%.

Dissolvable metals, such as Mg, Al, or their alloys, react with water to form $Mg(OH)_2$ or $Al(OH)_3$, which then reacts with reactive oxide including but limited to active $SiO_2$, $Na_2Si_2O_3$, $Al_2SiO_5$, $Al_2O_3$ etc.

Optionally in any aspects, the inert oxide comprises at least one of silicate, $ZrO_2$.

Optionally in any aspects, the method further comprises steps of forming a corrosion resistant seal at the presence of water under high pressure high temperature at downhole.

In yet another aspect, one embodiment discloses a swellable composition suitable for use in subterranean wells. The swellable composition comprises a composite material, wherein the composite material swells on contact with water due to a chemical reaction of the composite material.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED EMBODIMENTS

Definitions

Figure 1A:
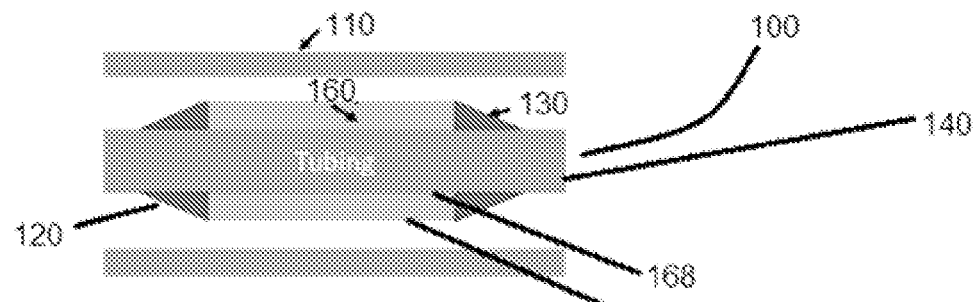
FIG. 1(a) illustrates a schematic showing an in-situ swellable packer in use in a casing underground during oil and gas exploration according to one exemplary embodiment.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All percentages for weights expressed herein are by weight of the total food product unless specifically stated otherwise.

The technical means, creative features, objectives, and effects of the patent application may be easy to understand, the following embodiments will further illustrate the Patent Application. However, the following embodiments are only the preferred embodiments of the utility Patent Application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

EXEMPLARY EMBODIMENTS

Herein disclosed are novel systems, and methods that pertain to downhole tools usable for wellbore operations, details of which are described herein.

The packer may be suitable for frac operations. In an exemplary embodiment, the packer may be a composite packer made of swellable material, the packer being suitable for use in vertical or horizontal wellbores.

Broadly, the present embodiment discloses method or design to form in-situ swellable packer with a unique formulation and processing that enable packer forming and dissolving functions.

This invention disclosure provides a formulation and deployment method to achieve reliable seal at extremely high temperature where rubber seals degrade readily (>230° C.). More specifically, the disclosed invention provides a formulation to make reactive composite material that can react with downhole fluids to form a super reliable seal material for HTHP corrosive environment. Deployment method is also proposed to use it as a packer or a bridge plug. Various oil service companies tried different routes to manufacture such high temperature seal, but cannot deliver a reliable product with V0 level of sealing performance. Potential applications would be downhole tools (packer, bridge plugs, etc.) used in extremely harsh environment, such as geothermal wells, HTHP gas wells, thermal injection wells, etc.

As shown in FIG. 1(a), a downhole tool 100 useable for isolating sections of a wellbore 110 may comprise a cylindrical body 160 having a backup piece 120 or 130 at least at one end of the cylindrical body 160; and a tube 140 extends through the cylindrical body 160 and backup piece 120 or 130. The cylindrical body 160 is made of a swellable material. The cylindrical body 160 may comprise an external surface 162, and an inner bore surface 168 formed around the tube 140. The swellable material may be expandable vertical to the tube 140 to form an in-situ manufactured tool downhole.

In another embodiment, the downhole tool 100 may have both a distal end backup piece 120, a proximate end backup piece 130; a tube 140, and a cylindrical body 160.

The tube 140 may extend from the distal end backup piece 120 to the proximate end backup piece 130. The cylindrical body 160 is between the distal end backup piece 120 and the proximate end backup piece 130. The cylindrical body 160 is made of a swellable material, such as a composite material. The composite material swells on contact with water due to chemical reaction of the composite material.

Downhole tools according to embodiments disclosed herein may include one or more anchor slips (not shown), one or more compression cones (not shown) engageable with the slips, and a compressible seal element disposed therebetween, all of which may be configured or disposed around a plug. The tool may include a flow bore open to an end of the tool and extending to an opposite end of the tool. Thus, the tool may be suitable for frac operations. In an exemplary embodiment, the tool may be a composite frac plug made of expendable material, the plug being suitable for use in vertical or horizontal wellbores.

Figure 1B:
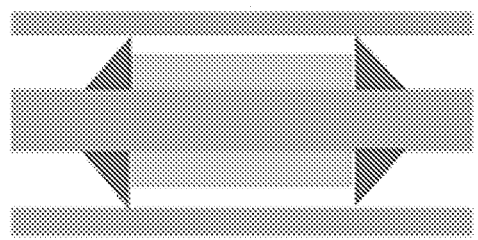
FIG. 1(b) illustrates a schematic showing an in-situ swellable packer with two metal backups expandable vertical to the packer according to one embodiment.

A downhole tool useable for isolating sections of a wellbore may include a first set of threads and a second set of threads (not shown). The downhole tool may include a degradable member disposed about the downhole tool and in engagement with a seal element also disposed about the downhole tool. In accordance with the disclosure, the degradable member may be partially deformable. For example, upon application of a load, a portion of the expendable member, such as a resilient portion, may withstand the load and maintain its original shape and configuration with little to no deflection or deformation. At the same time, the load may result in another portion, such as a deformable portion, such as the backup piece, that experiences a deflection or deformation, to a point that the deformable portion, such as the backup piece, changes shape from its original configuration and/or position to expand vertical to the tube as shown in FIG. 1(b).

The downhole tool may include a first slip disposed about the downhole tool and configured for an engagement with the expendable member, such as a composite material, for example. In an embodiment, the first slip may engage an angled surface of a resilient portion of the expandable member. The downhole tool may further include a cone piece disposed about the downhole tool. The cone piece may include a first end and a second end.

The first end may be configured for engagement with the seal element. The downhole tool may also include a second slip, which may be configured for contact with the cone. In an embodiment, the second slip may be moved into an engagement or compression with the second end of the cone during setting. In another embodiment, the second slip may have a one-piece configuration with at least one groove or undulation disposed therein.

In accordance with embodiments of the disclosure, setting of the downhole tool in the wellbore may include the first slip and the second slip in gripping engagement with a surrounding tubular or wellbore 110, the seal element sealingly engaged with the surrounding wellbore 110, and/or application of a load to the plug sufficient enough to shear one of the sets of the threads.

Any of the slips may be made of a composite material or metal (e.g., Mg alloy or Al alloy). Any of the slips may include gripping elements, such as inserts, buttons, teeth, serrations, etc., configured to provide gripping engagement of the tool with a surrounding surface, such as the tubular. In an embodiment, the second slip may include a plurality of inserts disposed therearound. In some aspects, any of the inserts may be configured with a flat surface, while in other aspects, any of the inserts may be configured with a concave surface (with respect to facing toward the wellbore).

Figure 1C:
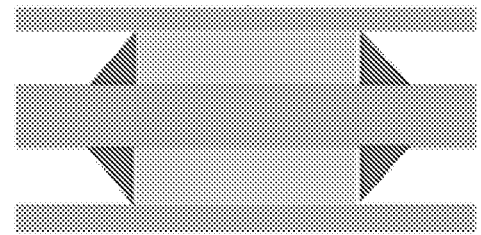
FIG. 1(c) depicts the in-situ swellable packer expanded to fit the contour of the casing after chemical reactions of the compact according to one embodiment.
Figure 2:
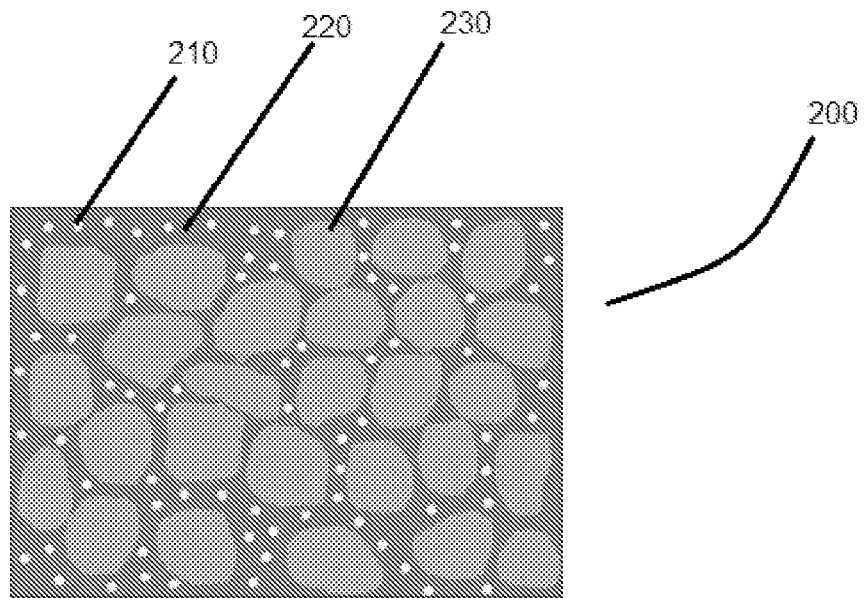
FIG. 2 schematically depicts a swellable composition.

The downhole tool (or tool components) may include a longitudinal axis, including a central long axis. During setting of the downhole tool, the deformable portion, such as the proximate end backup piece or the distal end backup piece may expand or "flower", such as in a radial direction away from the axis, as shown in FIGS. 1(b) and 1(c). Setting may further result in the expandable member and the seal element compressing together to form a reinforced seal or barrier therebetween. In embodiments, upon compressing the seal element, the seal element may partially collapse or buckle around an inner circumferential channel or groove disposed therein.

In an embodiment, one of the sets of threads on the downhole tool 100 may be shear threads. In other embodiments, one of the sets of threads may be shear threads disposed along a surface of the bore at the proximate end. In yet other embodiments, one of the sets of threads may be rounded threads. For example, one of the sets of threads may be rounded threads that are disposed along an external mandrel surface, such as at the distal end. The round threads may be used for assembly and setting load retention.

The downhole tool may be coupled with a setting adapter configured with corresponding threads that mate with the first set of threads. In an embodiment, the downhole tool may be configured for fluid to flow therethrough. The downhole tool may also be coupled with a sleeve configured with corresponding threads that mate with threads on the end of the plug. In an embodiment, the sleeve may mate with the second set of threads. In other embodiments, setting of the downhole tool may result in distribution of load forces along the second set of threads at an angle that is directed away from an axis.

In embodiments, an e-line or wireline mechanism may be used in conjunction with deploying and/or setting the tool. There may be a pre-determined pressure setting; where upon excess pressure produces a tensile load on the downhole tool that results in a corresponding compressive force indirectly between the downhole tool and a setting sleeve. The use of the stationary setting sleeve may result in one or more slips being moved into contact or secure grip with the surrounding tubular, such as a casing string, and also a compression (and/or inward collapse) of the expandable materials. The distal end backup piece and proximate end backup piece may expand vertical to the tube upon this trigger action, such as this compression. The axial compression of the expandable materials may be essentially simultaneous (but not necessarily) to its radial expansion outward and into sealing engagement with the surrounding the wellbore 110 with the external surface 162 in line with the wellbore 110, as shown in FIGS. 1(b) and 1(c). To disengage the tool from the setting mechanism (or wireline adapter), sufficient tensile force may be applied to the plug to cause mated threads therewith to shear.

The swellable materials 200 may be a composite material. The composite material, comprising a metal 220, such as Mg, Al, lithium, calcium, or their alloys, for example, swells on contact with water due to chemical reaction of the composite material, as shown below as an example:

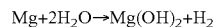

$$Mg+2H_2O \rightarrow Mg(OH)_2+H_2$$

The composite material may comprise a reactive oxide 210, such as silicon oxide, $Na_2Si_2O_3$, $Al_2SiO_5$, $Al_2O_3$. The swellable materials 200 may further comprise an inert oxide 230, such as silicate, $ZrO_2$, zeolite, molecular sieves, and mesoporous materials, such as MCM-41. The inert oxide 230 volume percent may be from about 20% to about 60%. In some embodiment, the inert oxide volume percent may be from about 10% to about 40%.

Figure 3:
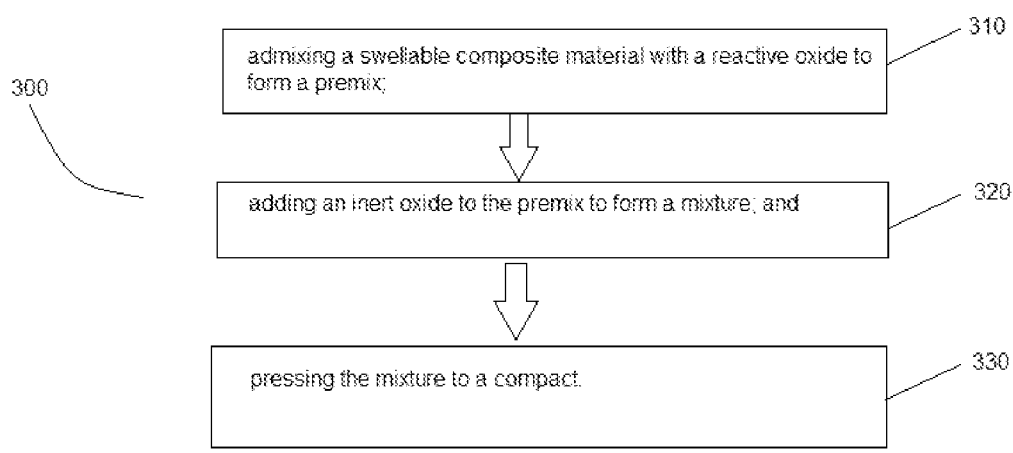
FIG. 3 illustrates a flow chart of method of making in-situ swellable downhole tool according to one embodiment.

As shown in FIG. 3, a method 300 for manufacturing swellable compositions suitable for use in subterranean wells may comprise steps of admixing a swellable composite material with a reactive oxide to form a premix in step 310; adding an inert oxide to the premix to form a mixture in step 320; and pressing the mixture to a compact in step 330.

In the step 310, the swellable composite material may include dissolvable metal powder, such as Mg, Al, lithium, calcium, or their alloys powder, for example. The reactive oxide may include silicon oxide, $Na_2Si_2O_3$, $Al_2SiO_5$, $Al_2O_3$, for example. The inert oxide may include silicate, $ZrO_2$, zeolite, molecular sieves, and mesoporous materials. In the step 330, hot press, cold press, or hot isostatic pressing (HIP) may be used.

More specifically, dissolvable Mg or Mg alloy powder is blended evenly with $SiO_2$ powder first to form a premix. An inert oxide is then added to get premix. This mixture is put into a mold and compressed at desirable temperature and pressure to get a compact with a desirable porosity. Certain porosity may be favored for water to diffuse, and to increase reaction rate. A compact of too high porosity will not have enough mechanical strength. Mg and $SiO_2$ mole fraction is from about 0.5 to about 2, for example. The inert oxide volume percent may be from about 20% to about 60%, for example. Porosity of final composite is controlled from about 0.5% to about 10%, for example. The press temperature is from about room temperature to about 700° C., for example. In addition, the compressing pressure may be from about 500 to about 5000 psi, for example.

Dissolving rate of Mg alloy may be above >20 mg/cm$_2$/hr. Size of both Mg and SiO$_2$ powder may be below 500 μm for example to get enough reaction rate. Inert oxide size may be from about 100 μm to about 3 mm, for example, for strength enhancement.

In one embodiment, the method 200 may further comprise step of forming a corrosion resistant seal at the presence of water under high pressure high temperature at downhole, as shown the chemical reaction below as an example:

$$3Mg(OH)_2 + 4SiO_2 \rightarrow Mg_3Si_4O_{10}(OH)_2 + 2H_2O$$

$$Mg(OH)_2 + Aluminosilicate + H_2O \rightarrow Magnesium\ Silicate\ Hydrate + Other\ Reaction\ Products$$

$$Mg(OH)_2 + Na_2SiO_5 \rightarrow MgSiO_4 + 2NaOH$$

$$Mg(OH)_2 + Al_2O_3 \rightarrow MgAl_2O_4 + 2H_2O$$

$$Al(OH)_3 + Na_2SiO_4 \rightarrow NaAl(SiO_4)_2 + 2H_2O$$

$$Mg(OH)_2 + CaCO_3 \rightarrow CaMg(CO_3)_2Al_2O_3 + 2SiO_2 \rightarrow Al_2Si_2O_5(OH)_4 + 2H_2O$$

$$2CaCO_3 + Mg \rightarrow CaMg(CO_3)_2 + Ca$$

In the downhole condition, dissolvable metal reacts with water very fast and provide Mg(OH)$_2$ resource continuously. Besides, the dissolving process generates lots of heat since it is an exothermic reaction, which also accelerates reaction rate. The field observation shows that the crystallization process happens mainly in high temperature wells or fast dissolving alloys. It is consistent with literature report and lab test of this reaction. SiO$_2$ source is believed to come from hydraulic sand or formulation.

The reaction of MgO with a soluble source of silica generally forms a poorly crystalline talc-like or serpentine-like phase, the precise structure of which is still under investigation and appears to depend significantly on the Mg/Si ratio.

Modern M-S—H (magnesium-silicate-hydrate) cements are generally formed from a source of magnesium (typically MgO) and a source of highly reactive silica (e.g., silica fume) in situ, rather than forming from the hydration of a magnesium silicate clinker, because magnesium silicates are nonhydraulic. Non-hydraulic cement is cement which cannot harden while in contact with water.

Product of these reactions may be TALC or other materials, as shown below table, which is believed to be a great bonding/cementing material. TALC is finally bonded to inert oxide, such as silicate, ZrO$_2$, for example, to form this hard and corrosion resistant seal materials. It can thus bond sand or other mineral together to form this super-hard recrystallized product, like a cement material. Since TALC is hard and brittle, sand is required to provide enough compressive strength. Based on lab test, it is resistant to all acid environment that could possibly exist in downhole.

| Mineral | Group | Formulation |
| --- | --- | --- |
| Lizardite | Serpentine | $Mg_3(Si_2O_5)(OH)_4$ |
| Antigorite | Serpentine | $Mg_3(Si_2O_5)(OH)_4$ |
| Chrysotile | Serpentine | $Mg_3(Si_2O_5)(OH)_4$ |
| sepiolite | Phyllosilicate | $Mg_4(Si_6O_{15})(OH)_2\ 6H_2O$ |
| sepiolite | Phyllosilicate | $Ca_{0.25}(Mg,Fe)_3((Si,Al)_4O_{10})(OH)_2H_2O$ |
| Talc | Phyllosilicate | $Mg_3(Si_4O_{10})(OH)_2$ |

In use, take a packer as an example, reactive compact may be mounted on a tube with metal backup at least one of two ends (FIG. 1(a)). When the tool reaches the position, backup metal piece is expanded to touch casing, creating a stagnant environment for reactive composite (FIG. 1(b)). Stagnant environment may be critical for continuous reaction. It should allow water to flow, but trap reacted material in the closed environment. In this limited space, reactive compact may react and absorb water, and finally form recrystallized seal (FIG. 1(c)).

The above shows and describes the basic principles, main features and advantages of the utility Patent Application. Those skilled in the industry should understand that the present utility Patent Application is not limited by the above-mentioned embodiments. The above-mentioned embodiments and the description are only preferred examples of the present utility Patent Application and are not intended to limit the present utility Patent Application, without departing from the present utility Patent Application. Under the premise of spirit and scope, the present utility patent application will have various changes and improvements, and these changes and improvements fall within the scope of the claimed utility Patent Application. The scope of protection claimed by the utility Patent Application is defined by the appended claims and their equivalents.

We claim:

1. A swellable composition, suitable for use in subterranean wells, comprising:
   a composite material, wherein the composite material comprises an inorganic material and dissolvable metals, which swell on contact with water due to chemical reaction of the composite material; and
   an inert oxide, wherein the swellable composition has porosity from about 0.5% to about 10%.

2. The composition of claim 1, wherein the composite material further comprises a reactive oxide.

3. The composition of claim 1, wherein the dissolvable metal comprises at least one of Mg, Al, or their alloys.

4. The composition of claim 2, wherein the reactive oxide comprises at least one of silicon oxide, Na$_2$Si$_2$O$_3$, Al$_2$SiO$_5$, Al$_2$O$_3$.

5. The composition of claim 1, wherein the inert oxide comprises zeolite or molecular sieves.

6. The composition of claim 1, wherein the inert oxide comprises at least one of silicate, ZrO$_2$.

7. The composition of claim 1, wherein the inert oxide volume percent is from about 10% to about 40%.

* * * * *